United States Patent
Ueda

(10) Patent No.: US 10,442,969 B2
(45) Date of Patent: Oct. 15, 2019

(54) HEAT STORAGE MATERIAL COMPOSITION AND USE THEREOF

(71) Applicant: KANEKA CORPORATION, Osaka (JP)

(72) Inventor: Toru Ueda, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/137,030

(22) Filed: Sep. 20, 2018

(65) Prior Publication Data

US 2019/0023958 A1    Jan. 24, 2019

Related U.S. Application Data

(63) Continuation of application No. PCT/JP2017/011706, filed on Mar. 23, 2017.

(30) Foreign Application Priority Data

Mar. 23, 2016   (JP) .................................. 2016-059161

(51) Int. Cl.
*C09K 5/06*   (2006.01)

(52) U.S. Cl.
CPC ................ *C09K 5/063* (2013.01); *C09K 5/06* (2013.01)

(58) Field of Classification Search
CPC ..................................................... C09K 5/06
See application file for complete search history.

(56) References Cited

U.S. PATENT DOCUMENTS

| | | | | |
|---|---|---|---|---|
| 4,408,654 A | * | 10/1983 | Doomernik | F25D 17/02 165/10 |
| 4,585,572 A | * | 4/1986 | Lane | C09K 5/063 126/400 |
| 5,100,570 A | * | 3/1992 | Ames | C09K 5/02 165/10 |
| 5,453,213 A | | 9/1995 | Kakiuchi et al. | |
| 5,567,346 A | | 10/1996 | Kakiuchi et al. | |
| 8,741,169 B2 | * | 6/2014 | Rieger | C09K 5/063 252/62 |

FOREIGN PATENT DOCUMENTS

| | | |
|---|---|---|
| JP | S56-147884 A | 11/1981 |
| JP | H06-080958 A | 3/1994 |
| JP | H06-080959 A | 3/1994 |
| JP | H07-048564 A | 2/1995 |
| JP | H07-188648 A | 7/1995 |
| JP | H07-316535 A | 12/1995 |
| JP | H10-036823 A | 2/1998 |
| JP | H10-330741 A | 12/1998 |
| JP | 2007-217460 A | 8/2007 |

OTHER PUBLICATIONS

International Search Report issued in International Application No. PCT/JP2017/011706, dated Apr. 18, 2017 (2 pages).

* cited by examiner

*Primary Examiner* — Anthony J Green
(74) *Attorney, Agent, or Firm* — Osha Liang LLP

(57) ABSTRACT

One or more embodiments of the present invention provide (i) a novel heat storage material composition, (ii) a heat storage material containing the heat storage material composition, and (iii) a transport container including the heat storage material. A heat storage material composition in accordance with one or more embodiments of the present invention may contain sodium sulfate 10-hydrate, sodium bromide, and sodium chloride, and have a melting point and a solidifying point within a range of 0° C. to 10° C.

9 Claims, 4 Drawing Sheets

HEAT STORAGE MATERIAL COMPOSITION AND USE THEREOF

TECHNICAL FIELD

One or more embodiments of the present invention relate to (i) a heat storage material composition for controlling a temperature of an article and (ii) the use of the heat storage material composition (e.g., a heat storage material containing the heat storage material composition, and a transport container including the heat storage material).

BACKGROUND

Some of pharmaceutical products and specimens handled in medical facilities such as hospitals, and some of foods and the like available in supermarkets and the like need to be kept cold or warm within a certain temperature range during transportation so that their qualities are maintained.

As a method of keeping such articles (e.g., pharmaceutical products, specimens, foods, and the like) cold or warm, there has conventionally been known a method in which (i) a heat storage material, which has been melted or solidified in advance, is placed in a transport container having a thermal insulation property and (ii) latent heat of the heat storage material is utilized so that an article placed in the transport container is kept cold or warm. In order that the temperature of an article to be kept cold or warm can be maintained within a certain temperature range for a long period of time, it is preferable to use a heat storage material that (i) has a melting point or a solidifying point within the certain temperature range and (ii) has a large quantity of latent heat.

A heat storage material containing water as its main component has commonly been used as an inexpensive and safe heat storage material having a large quantity of latent heat. Water has a melting point at around 0° C. Therefore, in a case where the temperature of an article needs to be controlled at a temperature of not higher than 0° C., (i) a solidifying point depressant is added to the water so that the melting point is adjusted to be not higher than 0° C., and (ii) a resultant mixture of the water and the solidifying point depressant is used as a heat storage material composition. However, in a case where a control temperature (i.e., a temperature at which the temperature of an article needs to be controlled) is above 0° C., it is difficult to use a heat storage material composition, containing water as its main component, to control the temperature of an article at its desired control temperature. Specific examples of an article whose control temperature is above 0° C. include blood, blood plasma, specimens, and pharmaceutical products. Generally, specimens are preferably kept at a control temperature of 4° C. to 6° C. during transportation, and pharmaceutical products are preferably kept at a control temperature of 2° C. to 8° C. during transportation.

As above, there exist many articles that need to be controlled at a temperature above 0° C., and therefore a large number of studies have been made in regard to a heat storage material composition that can be used to store or transport such articles. For example, there have been many cases of studies made on a composition containing, as its main component, sodium sulfate 10-hydrate which is one of inorganic hydrated salts having a large quantity of latent heat. Specifically, Patent Literatures 1 to 6 each disclose an example of a heat storage material composition which contains sodium sulfate 10-hydrate as its essential component and which, optionally, further contains a melting point adjuster containing, for example, an ammonium salt, a halogenated salt, and/or another inorganic salt(s).

CITATION LIST

Patent Literature

[Patent Literature 1]
Japanese Patent Application Publication Tokukaihei No. 10-330741 (1998) (Publication date: Dec. 15, 1998)
[Patent Literature 2]
Japanese Patent Application Publication Tokukaihei No. 7-316535 (1995) (Publication date: Dec. 5, 1995)
[Patent Literature 3]
Japanese Patent Application Publication Tokukaihei No. 7-188648 (1995) (Publication date: Jul. 25, 1995)
[Patent Literature 4]
Japanese Patent Application Publication Tokukaihei No. 7-048564 (1995) (Publication date: Feb. 21, 1995)
[Patent Literature 5]
Japanese Patent Application Publication Tokukaihei No. 10-036823 (1998) (Publication date: Feb. 10, 1998)
[Patent Literature 6]
Japanese Patent Application Publication Tokukaihei No. 6-080958 (1994) (Publication date: Mar. 22, 1994)

Most of the above-described heat storage material compositions containing sodium sulfate 10-hydrate as its main component are configured to utilize a melting/solidifying point adjusting effect of an ammonium salt (e.g., ammonium chloride or ammonium bromide), which is therefore an essential component of such a heat storage material composition.

Ammonium salts are, however, substances which require care when handled. This is because, for example, (i) ammonium salts are designated as notifiable substances under the Japanese Industrial Safety and Health Act, and (ii) when reacts with an oxidant, an ammonium salt causes an explosion and may consequently cause a fire. Moreover, ammonium salts are easily degraded due to influence of, for example, temperature, humidity, or pH. In a case where an ammonium salt is degraded, it produces an obnoxious ammonia odor. It is therefore difficult to use an ammonium salt in an open system. Furthermore, in a case where such an ammonia odor leaks into an ambient environment, it presumably causes a significant adverse effect to the ambient environment.

As such, a conventional heat storage material composition still had room for improvement, and the performance of a conventional heat storage material composition was not adequate.

SUMMARY

One or more embodiments of the present invention provide a novel heat storage material composition, a heat storage material containing the heat storage material composition, and a transport container including the heat storage material.

The inventor accomplished one or more embodiments of the present invention by making the following novel findings: (i) a high performance heat storage material composition may be obtained by combining a particular halogenated metal salt with sodium sulfate 10-hydrate; and (ii) particularly even in a case where a heat storage material composition contains substantially no particular ammonium salt, the heat storage material composition allows for (a) temperature control within a range of 0° C. to 10° C. and (b)

temperature maintenance for a long period of time because of a large quantity of latent heat of such a heat storage material composition.

<1> A heat storage material composition in accordance with one or more embodiments of the present invention contains: sodium sulfate 10-hydrate; sodium bromide; and sodium chloride, the heat storage material composition having a melting point and a solidifying point within a range of 0° C. to 10° C.

One or more embodiments of the present invention advantageously allow for, for example, safe and stable storage or transportation of an article that requires control of temperature within a temperature region of 0° C. to 10° C.

DETAILED DESCRIPTION OF THE EMBODIMENTS

Figure 1:
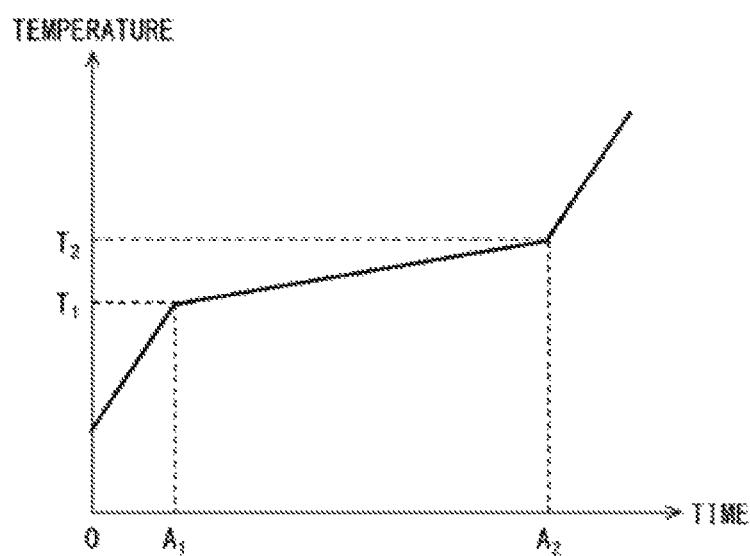
FIG. 1 is a graph schematically illustrating a change over time in temperature of a heat storage material composition during a process in which the heat storage material composition is melting from a solid state into a liquid state.

The following description will discuss embodiments of the present invention. The present invention is, however, not limited to such embodiments. The present invention is not limited to any configurations described below, and can be altered in various ways within the scope of the claims. The technical scope of one or more embodiments of the present invention also encompasses embodiments and examples derived from a proper combination of technical means disclosed in different embodiments and examples. All academic and patent literatures listed herein are incorporated herein by reference. Any numerical range expressed as "A to B" as used herein means "not less than A (A or more) and not more than B (B or less)" unless otherwise specified.

[1. Heat Storage Material Composition]

A heat storage material composition in accordance with one or more embodiments of the present invention (hereinafter also referred to as "the heat storage material composition") is usable as a heat storage material of a latent heat type, in which the following properties (1) and (2) of the heat storage material composition are utilized: (1) the heat storage material composition absorbs thermal energy in phase transition of the heat storage material composition from a solidified (solid) state to a molten (liquid) state; and (2) the heat storage material composition releases thermal energy in phase transition of the heat storage material composition from the molten (liquid) state to the solidified (solid) state.

For example, since the heat storage material composition absorbs thermal energy in phase transition from the solidified state to the molten state, the heat storage material composition makes it possible to maintain a temperature of an article at its desired temperature of not higher than an ambient temperature, even in a high temperature environment (e.g., during summer). Moreover, since the heat storage material composition releases thermal energy in phase transition from the molten state to the solidified state, the heat storage material composition makes it possible to maintain a temperature of an article at its desired temperature of not lower than an ambient temperature, even in a low temperature environment (e.g., during winter). In other words, the heat storage material composition makes it possible to maintain a temperature of an article at its desired temperature (specifically, within a range of 0° C. to 10° C.) regardless of whether the article is in the high temperature environment or in the low temperature environment.

The following description will first discuss components of the heat storage material composition, and will then discuss physical properties (e.g., a melting point, a solidifying point, and a quantity of latent heat) of the heat storage material composition.

[1-1. Components of Heat Storage Material Composition]

The heat storage material composition only needs to contain (i) sodium sulfate 10-hydrate, sodium bromide, and (iii) sodium chloride, and other configurations of the heat storage material composition are not limited to any particular ones. For example, the heat storage material composition can be made of sodium sulfate 10-hydrate, sodium bromide, and sodium chloride. Note that, in the heat storage material composition, the sodium sulfate 10-hydrate serves as a latent heat storage agent, and (ii) the sodium bromide and the sodium chloride serve as melting/solidifying point adjusters that adjust the melting point and the solidifying point of the heat storage material composition.

There is no particular limitation to respective amounts of the sodium bromide and the sodium chloride contained in the heat storage material composition. However, a total amount of the sodium bromide and the sodium chloride contained in the heat storage material composition is preferably not less than 0.5 mol and not more than 2.0 mol, more preferably not less than 0.7 mol and not more than 2.0 mol, even more preferably not less than 0.9 mol and not more than 1.5 mol, still even more preferably not less than 1.0 mol and not more than 1.3 mol, and most preferably not less than 1.1 mol and not more than 1.2 mol, relative to 1.0 mol of the sodium sulfate 10-hydrate. With the configuration, the heat storage material composition makes it possible to maintain an article at its appropriate temperature with high accuracy during storage or transportation, when used in the storage or the transportation. For example, the total amount of the sodium bromide and the sodium chloride is preferably not less than 1.0 mol and not more than 1.3 mol relative to 1.0 mol of the sodium sulfate 10-hydrate, because such a configuration allows both of the melting point and the solidifying point to fall within a temperature range of 0° C. to 10° C. with high accuracy.

There is no particular limitation to a ratio of the respective amounts of the sodium bromide and the sodium chloride contained in the heat storage material composition. However, on the premise that the amount of the sodium bromide is more than 0 mol, an amount of the sodium bromide is preferably not more than 7.0 mol, more preferably not more than 6.0 mol, even more preferably not more than 5.0 mol, still even more preferably not more than 4.0 mol, further even more preferably not more than 3.0 mol, especially even more preferably not more than 2.5 mol, and particularly preferably not more than 2.0 mol, relative to 1.0 mol of the sodium chloride. The configuration allows for providing a heat storage material composition having a larger quantity of latent heat.

Since the heat storage material composition contains sodium sulfate 10-hydrate as its main component, the heat storage material composition can be safely prepared at low cost.

The heat storage material composition can also contain another latent heat storage agent other than the sodium sulfate 10-hydrate. Examples of such a latent heat storage agent include sodium thiosulfate 5-hydrate, calcium chloride 6-hydrate, sodium acetate 3-hydrate, disodium hydrogen phosphate 12-hydrate, sodium carbonate 10-hydrate, sodium sulfite 7-hydrate, magnesium sulfate 7-hydrate, and calcium sulfate 2-hydrate.

There is no particular limitation to an amount of the another latent heat storage agent, which is contained in the heat storage material composition and which is different from the sodium sulfate 10-hydrate. However, the amount of the another latent heat storage agent is preferably not more than 1.0 mol, more preferably not more than 0.1 mol, and most preferably not more than 0.01 mol, relative to 1.0 mol of the sodium sulfate 10-hydrate. A larger amount of the sodium sulfate 10-hydrate contained in the heat storage material composition allows for a safer and more inexpensive heat storage material composition having a larger quantity of latent heat.

The heat storage material composition contains sodium bromide and sodium chloride as melting/solidifying point adjusters. The configuration not only allows for preparation of the heat storage material composition at low cost but also allows for providing a safe and environment-friendly heat storage material composition.

The heat storage material composition can also contain another melting/solidifying point adjuster other than the sodium bromide and the sodium chloride. Examples of such a melting/solidifying point adjuster include ammonium salts, halogenated metal salts other than sodium bromide and sodium chloride, non-halogenated metal salts, urea, and alcohols.

Examples of the ammonium salts include ammonium chloride, ammonium bromide, ammonium sulfate, ammonium nitrate, ammonium carbonate, ammonium hydrogen carbonate, ammonium carbamate, ammonium hydrogen carbonate carbamate, ammonium formate, ammonium citrate, and ammonium acetate.

Note, however, that ammonium salts are substances which require care when handled, and also that ammonium salts may cause a significant adverse effect to an environment by producing an obnoxious ammonia odor. From the viewpoint of providing a heat storage material composition that causes no such an adverse effect of ammonium salts, an amount (in other words, contained amount) of an ammonium salt contained in the heat storage material composition is preferably not more than 1 wt %, more preferably not more than 0.5 wt %, even more preferably not more than 0.1 wt %, still even more preferably not more than 0.01 wt %, and particularly preferably 0 wt % of the heat storage material composition.

Examples of the halogenated metal salts other than sodium bromide and sodium chloride include lithium chloride, lithium bromide, lithium iodide, sodium iodide, potassium chloride, potassium bromide, potassium iodide, magnesium chloride, magnesium bromide, calcium chloride, and calcium bromide.

Examples of the non-halogenated metal salts include sodium sulfate, sodium nitrate, sodium acetate, sodium phosphate, sodium boron hydride, sodium formate, sodium oxalate, sodium carbonate, sodium glutamate, sodium hydroxide, potassium sulfate, potassium nitrate, potassium acetate, potassium phosphate, potassium boron hydride, potassium formate, potassium oxalate, potassium carbonate, potassium glutamate, potassium hydroxide, calcium sulfate, calcium nitrate, calcium carbonate, calcium glutamate, calcium hydroxide, aluminum sulfate, aluminum nitrate, aluminum phosphate, aluminum formate, aluminum carbonate, aluminum hydroxide, magnesium sulfate, magnesium nitrate, magnesium carbonate, magnesium glutamate, and magnesium hydroxide.

Examples of the alcohols include lower alcohols such as methanol, ethanol, 2-propanol, ethylene glycol, and glycerol, and higher alcohols such as caprylic alcohol, lauryl alcohol, myristyl alcohol, cetyl alcohol, stearyl alcohol, oleyl alcohol, and linolenic alcohol.

From the viewpoint of more accurately adjusting a temperature of an article to its desired temperature, an amount of a halogenated metal salt, which is contained in the heat storage material composition in accordance with one or more embodiments of the present invention and which is different from the sodium bromide and the sodium chloride, is preferably not more than 0.5 mol, more preferably not more than 0.3 mol, even more preferably not more than 0.2 mol, and most preferably not more than 0.1 mol, relative to 1.0 mol of the sodium sulfate 10-hydrate.

The heat storage material composition preferably contains, as a melting/solidifying point adjuster, potassium chloride other than the sodium bromide and the sodium chloride. The heat storage material composition containing potassium chloride advantageously makes it possible to maintain a temperature of an article in a range of 2° C. to 8° C. for a long period of time during both of melting and solidification.

The heat storage material composition preferably contains the potassium chloride in an amount of less than 0.2 mol, relative to 1.0 mol of the sodium sulfate 10-hydrate contained in the heat storage material composition. The amount of the potassium chloride is more preferably not more than 0.17 mol, and even more preferably not more than 0.15 mol. Although a lower limit of the amount of the potassium chloride is not particularly limited, the lower limit is preferably not less than 0.01 mol, and more preferably more than 0.1 mol. The heat storage material composition containing the potassium chloride within the above range advantageously makes it possible to maintain a temperature of an article in a range of 2° C. to 8° C. for a longer period of time during both of melting and solidification.

As will be described later, the heat storage material composition, when used, is put in, for example, a container or the like such that the container or the like is filled with the heat storage composition. However, in a case where the container or the like that is filled with the heat storage material composition breaks during transportation or conveyance, the heat storage material composition may leak out of the container or the like. There is a concern that in such a case, the heat storage material composition which has thus leaked out may (i) contaminate an article which is a temperature control target and/or (ii) spill out of the container or the like and cause an adverse effect on an environment.

Therefore, in order to minimize spill of the heat storage material composition out of the container or the like even in a case where the container or the like that is filled with the heat storage material composition breaks during transportation, it is preferable that the heat storage material composition have a solid form or a gel-like form. Note that examples of a gelling agent, which turn the heat storage material composition into a gel-like form, include: a mixture of (i) fumed silica, precipitated silica, gel-like silica, or aluminum 2-ethylhexanoate and (ii) a higher fatty acid such as lauric acid, myristic acid, palmitic acid, stearic acid, isostearic acid, behenic acid, undecylenic acid, oleic acid, linoleic acid, or linolenic acid; hydroxypropylcellulose; hydroxyethylcellulose; hydroxymethylcellulose; hydroxypropylmethylcellulose; carboxymethylcellulose; carboxymethylcellulose sodium; polyvinyl pyrrolidone; and carboxy vinyl polymers. Among those examples, carboxymethylcellulose sodium is preferable because it is excellent in gel stability and environmental adaptability.

Other than the above-described components, the heat storage material composition can also contain, as necessary, a crystal nucleating agent (e.g., sodium tetraborate 10-hydrate, silicate salt, or cryolite), a phase separation inhibitor (e.g., oleic acid, sodium oleate, potassium oleate, potassium metaphosphate, sodium silicate, or potassium isostearate), a perfume, a colorant, an antibacterial agent, a high molecular polymer, or other organic/inorganic compounds.

[1-2. Melting Point and Solidifying Point of Heat Storage Material Composition]

The heat storage material composition only needs to have a melting point and a solidifying point within a range of 0° C. to 10° C.

The melting point of the heat storage material composition as used herein refers to a temperature of the heat storage material composition at which temperature the heat storage material composition starts melting from the solid state into the liquid state. For example, FIG. 1 schematically illustrates a change over time in temperature of the heat storage material composition in a case where a constant amount of heat is supplied per unit time to the heat storage material composition in the solid state. According to FIG. 1, during a time period between time points 0 and $A_1$, supplied heat is utilized as sensible heat of a heat storage material in a solid state, and causes an increase in temperature of the heat storage material composition in the solid state. At the time point $A_1$, the heat storage material composition starts melting from the solid state. The temperature of the heat storage material composition at the time point $A_1$ is hereinafter referred to as $T_1$ (melting start temperature). During a time period between time points $A_1$ and $A_2$, (i) latent heat of melting causes a temperature increase of the heat storage material composition to be more gradual as compared with a temperature increase caused by the supplied heat that is utilized as sensible heat of the heat storage material in the solid state, and (ii) the heat storage material composition continues melting from the solid state while the temperature of the heat storage material composition gradually increases. At the time point $A_2$, the heat storage material composition finishes melting. The temperature of the heat storage material composition at the time point $A_2$ is hereinafter referred to as $T_2$ (melting finish temperature). During a time period following the time point $A_2$, supplied heat is utilized as sensible heat of the heat storage material in a liquid state, and causes a sharp increase in temperature of the heat storage material composition. As such, the melting point of the heat storage material composition as used herein refers to the temperature of the heat storage material composition at any time point between the time points $A_1$ and $A_2$, specifically to a temperature of not lower than $T_1$ and not higher than $T_2$.

Figure 2:
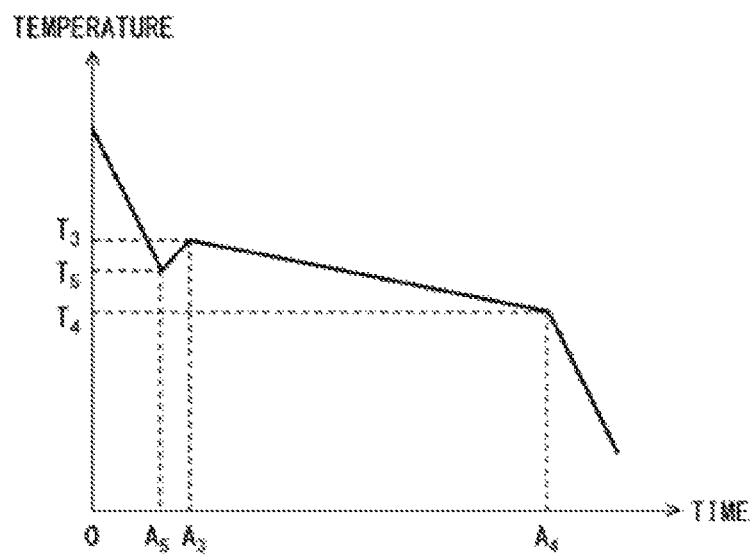
FIG. 2 is a graph schematically illustrating a change over time in temperature of a heat storage material composition during a process in which the heat storage material composition is solidifying from a liquid state into a solid state.

The solidifying point of the heat storage material composition as used herein refers to a temperature of the heat storage material composition at which temperature the heat storage material composition starts solidifying from the liquid state into the solid state. For example, FIG. 2 schematically illustrates a change over time in temperature of the heat storage material composition in a case where a constant amount of heat is absorbed per unit time from the heat storage material composition in the liquid state. According to FIG. 2, during a time period between time points 0 and $A_5$, absorbed heat is utilized as sensible heat of a heat storage material in a liquid state, and causes a decrease in temperature of the heat storage material composition in the liquid state. At the time point $A_5$, the heat storage material composition in the liquid state becomes supercooled. The temperature of the heat storage material composition at the time point $A_5$ is hereinafter referred to as $T_5$. A difference ($=T_3-T_5$) between (i) a temperature $T_3$ which will be described later and (ii) the temperature $T_5$ is defined as a supercooling temperature. During a time period between time points $A_5$ and $A_3$, the temperature of the heat storage material composition increases a little. At the time point $A_3$, the heat storage material composition starts solidifying from the liquid state. The temperature of the heat storage material composition at the time point $A_3$ is hereinafter referred to as $T_3$ (solidification start temperature). During a time period between time points $A_3$ and $A_4$, (i) latent heat of solidification causes a temperature decrease of the heat storage material composition to be more gradual as compared with a temperature decrease caused by the absorbed heat that is utilized as sensible heat of the heat storage material in the liquid state, and (ii) the heat storage material composition continues solidifying from the liquid state while the temperature of the heat storage material composition gradually decreases. At the time point $A_4$, the heat storage material composition finishes solidifying. The temperature of the heat storage material composition at the time point $A_4$ is hereinafter referred to as $T_4$ (solidification finish temperature). During a time period following the time point $A_4$, absorbed heat is utilized as sensible heat of the heat storage material in a solid state, and causes a sharp decrease in temperature of the heat storage material composition. As such, the solidifying point of the heat storage material composition as used herein refers to the temperature of the heat storage material composition at any time point between $A_3$ and $A_4$, specifically to a temperature of not lower than $T_4$ and not higher than $T_3$.

The melting point and the solidifying point of the heat storage material composition can be measured by (i) placing a measurement test sample in a commercially available thermostatic bath equipped with a temperature control unit, (ii) increasing or decreasing a temperature of the thermostatic bath at a certain rate, and (iii) monitoring a temperature of the test sample with the use of a thermocouple during the increasing or decreasing of the temperature of the thermostatic bath.

The melting point and the solidifying point each can fall within a particular temperature range out of the above-described temperature ranges. The melting point can fall within a range of, for example, 1° C. to 10° C., 2° C. to 10° C., 2° C. to 8° C., 3° C. to 10° C., 4° C. to 10° C., 5° C. to 10° C., 6° C. to 10° C., 7° C. to 10° C., 8° C. to 10° C., or 9° C. to 10° C. The solidifying point can fall within a range of, for example, 1° C. to 10° C., 1° C. to 9° C., 1° C. to 8° C., 2° C. to 8° C., 1° C. to 7° C., 1° C. to 6° C., 1° C. to 5° C., 1° C. to 4° C., 1° C. to 3° C., or 1° C. to 2° C. Among those ranges, from the viewpoint of transporting a specimen or a pharmaceutical product, the melting point and the solidifying point each fall within a range of preferably 1° C. to 8° C., and more preferably 2° C. to 8° C.

There is no particular limitation to the temperature $T_1$, at which the heat storage material composition starts melting, and the temperature $T_2$, at which the heat storage material composition finishes melting. However, from the viewpoint of more accurately maintaining an article at its appropriate temperature in storing or transporting the article with the use of the heat storage material composition, the temperatures $T_1$ and $T_2$ satisfy preferably a relational expression (1), more preferably a relational expression (2), even more preferably a relational expression (3), still even more preferably a relational expression (4), further even more preferably a relational expression (5), and especially even more preferably a relational expression (6) (see FIG. 1 for details of the temperatures $T_1$ and $T_2$):

$$-3.0 \leq T_1 - T_2 \leq 0 \quad (1)$$

$$-2.5 \leq T_1 - T_2 \leq 0 \quad (2)$$

$$-2.0 \leq T_1 - T_2 \leq 0 \quad (3)$$

$$-1.5 \leq T_1 - T_2 \leq 0 \quad (4)$$

$$-1.0 \leq T_1 - T_2 \leq 0 \quad (5)$$

$$-0.5 \leq T_1 - T_2 \leq 0 \quad (6)$$

There is no particular limitation to the temperature $T_3$, at which the heat storage material composition starts solidifying, and the temperature $T_4$, at which the heat storage material composition finishes solidifying. However, from the viewpoint of more accurately maintaining an article at its appropriate temperature in storing or transporting the article with the use of the heat storage material composition, the temperatures $T_3$ and $T_4$ satisfy preferably a relational expression (7), more preferably a relational expression (8), even more preferably a relational expression (9), still even more preferably a relational expression (10), further even more preferably a relational expression (11), and especially even more preferably a relational expression (12) (see FIG. 2 for details of the temperatures $T_3$ and $T_4$):

$$0 \leq T_3 - T_4 \leq 8 \quad (7)$$

$$0 \leq T_3 - T_4 \leq 6 \quad (8)$$

$$0 \leq T_3 - T_4 \leq 4 \quad (9)$$

$$0 \leq T_3 - T_4 \leq 3 \quad (10)$$

$$0 \leq T_3 - T_4 \leq 2 \quad (11)$$

$$0 \leq T_3 - T_4 \leq 1 \quad (12)$$

There is no particular limitation to the temperature $T_3$, at which the heat storage material composition starts solidifying, and the temperature $T_5$, at which the heat storage material composition becomes supercooled. However, from the viewpoint of more accurately maintaining an article at its appropriate temperature in storing or transporting the article with the use of the heat storage material composition (e.g., from the viewpoint of preventing the article from freezing), the temperatures $T_3$ and $T_5$ satisfy preferably a relational expression (13), more preferably a relational expression (14), even more preferably a relational expression (15), still even more preferably a relational expression (16), and further even more preferably relational expression (17) (see FIG. 2 for details of the temperatures $T_3$ and $T_5$):

$$0 \leq T_3 - T_5 \leq 5 \quad (13)$$

$$0 \leq T_3 - T_5 \leq 4 \quad (14)$$

$$0 \leq T_3 - T_5 \leq 3 \quad (15)$$

$$0 \leq T_3 - T_5 \leq 2 \quad (16)$$

$$0 \leq T_3 - T_5 \leq 1 \quad (17)$$

From the viewpoint of more accurately maintaining an article at its appropriate temperature in storing or transporting the article with the use of the heat storage material composition (e.g., from the viewpoint of preventing the article from freezing), the temperature $T_5$, at which the heat storage material composition becomes supercooled, and the temperature $T_4$, at which the heat storage material composition finishes solidifying, satisfy preferably a relational expression (18), more preferably a relational expression (18), and even more preferably a relational expression (19) (see FIG. 2 for details of the temperatures $T_4$ and $T_5$):

$$T_4\, T_5 \quad (18)$$

$$0 \leq T_4 \leq T_5 \quad (19)$$

[1-3. Quantity of Latent Heat of Heat Storage Material Composition]

In the phase transition of the heat storage material composition from the solidified state to the molten state (i.e., a melting process), the quantity of latent heat takes a positive value because the heat storage material composition absorbs thermal energy. In contrast, in the phase transition of the heat storage material composition from the molten state to the solidified state (i.e., a solidifying process), the quantity of latent heat takes a negative value because the heat storage material composition releases thermal energy. Note that an absolute value of the quantity of latent heat of the heat storage material composition in the melting process is theoretically equal to that of the quantity of latent heat of the heat storage material composition in the solidifying process. The quantity of latent heat as used herein indicates an average of (i) the absolute value of the quantity of latent heat in the melting process and (ii) the absolute value of the quantity of latent heat in the solidifying process.

The quantity of latent heat of the heat storage material composition can be measured with the use of a commercially available measurement device (e.g., a differential scanning calorimeter (specifically, SII EXSTAR6000 DSC) manufactured by Seiko Instruments Inc.). A specific method of the measurement should follow a protocol attached to such a measurement device.

The heat storage material composition in accordance with one or more embodiments of the present invention preferably has a large quantity of latent heat. For example, the quantity of latent heat of the heat storage material composition (specifically, the average of (i) the absolute value of the quantity of latent heat in the melting process and (ii) the absolute value of the quantity of latent heat in the solidifying process) is, but is not limited to, preferably not less than 150 J/g, more preferably not less than 155 J/g, even more preferably not less than 160 J/g, and most preferably not less than 165 J/g.

With the configuration, it is possible to maintain an article at an appropriate temperature for a longer period of time while the article is being stored or transported with the use of the heat storage material composition. That is, the configuration makes it possible to lengthen (i) the time period between the time points $A_1$ and $A_2$ indicated in FIG. 1 and (ii) the time period between the time points $A_3$ and $A_4$ indicated in FIG. 2. In other words, the heat storage material composition in accordance with one or more embodiments of the present invention allows for a long-distance transportation of an article.

[2. Heat Storage Material]

A heat storage material in accordance with one or more embodiments of the present invention (hereinafter also referred to as "the heat storage material") only needs to contain the above-described heat storage material composition. Other configurations, materials, and the like of the heat storage material are not limited.

The heat storage material can be produced by, for example, filling a container, a bag, or the like with the above-described heat storage material composition in accordance with one or more embodiments of the present invention.

The container or the bag is preferably produced by subjecting a resin (e.g., synthetic resin) to a shaping process. Examples of the resin include polyvinyl chloride, polyethylene, polypropylene, polyethylene terephthalate, polystyrene, nylon, and polyester. Those materials can be used alone or in combination of two or more kinds. From the viewpoint of handling and cost, the container or the bag is preferably made of polyethylene.

A shape of the container or the bag is not limited to any particular one. However, from the viewpoint of efficiently exchanging heat between the heat storage material composition and an article via the container or the bag, the container or the bag preferably has a shape that is thin and that can secure a large surface area (e.g., a shape having an uneven surface such as a pleated surface).

The heat storage material can be produced by filling such a container or a bag with the heat storage material composition. Note that more specific examples of the container or the bag include a container and a bag disclosed in Japanese Patent Application Publication Tokukai No. 2015-78307, which is incorporated herein by reference.

[3. Transport Container]

A transport container in accordance with one or more embodiments of the present invention may include the above-described heat storage material in accordance with one or more embodiments of the present invention. Other configurations, materials, and the like of the transport container are not particularly limited.

Figure 3A:
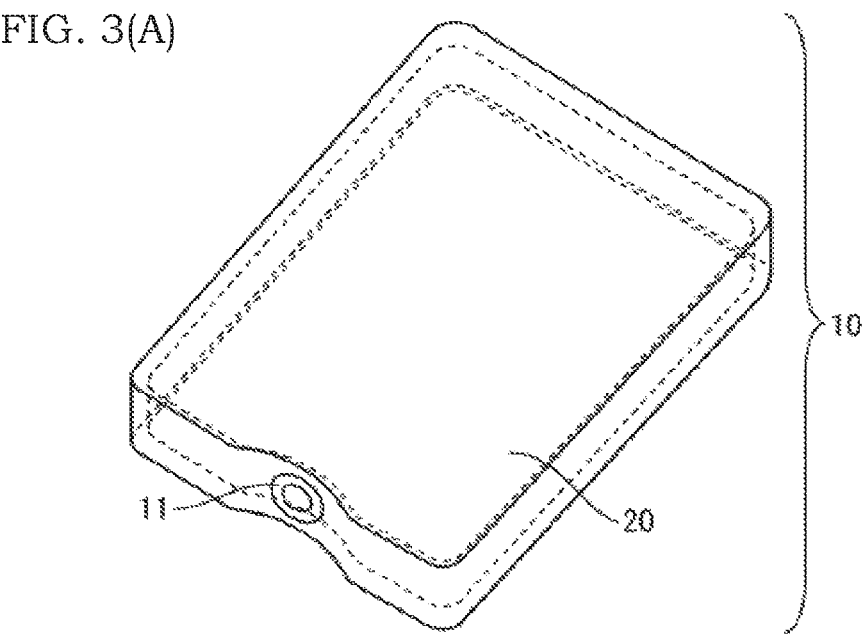
FIG. 3(A) is a perspective view schematically illustrating a heat storage material in accordance with one or more embodiments of the present invention.
Figure 3B:
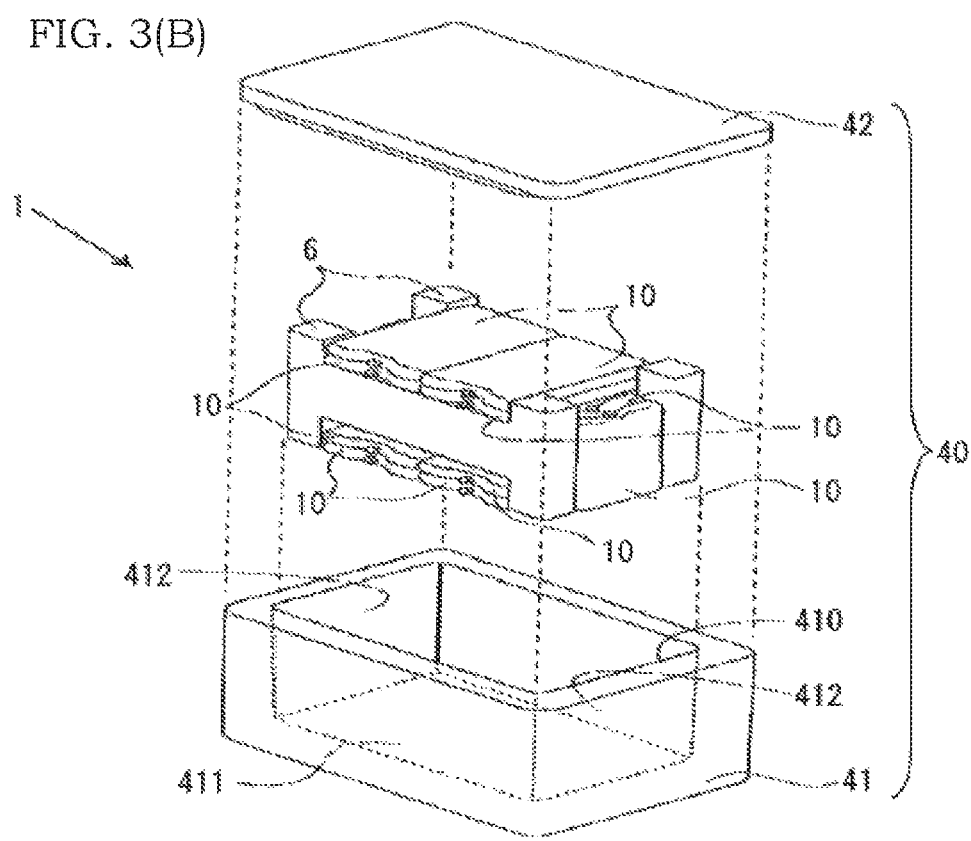
FIG. 3(B) is an exploded perspective view schematically illustrating a transport container in accordance with one or more embodiments of the present invention.

FIG. 3 illustrates an example of the transport container in accordance with one or more embodiments of the present invention. FIG. 3(A) is a perspective view schematically illustrating a heat storage material 10 in accordance with one or more embodiments of the present invention. FIG. 3(B) is an exploded perspective view schematically illustrating a transport container 1 in accordance with one or more embodiments of the present invention.

As illustrated in FIGS. 3(A) and 3(B), the heat storage material 10 in accordance with the present embodiment is filled with a heat storage material composition 20 in accordance with one or more embodiments of the present invention, through where a cap 11 of the heat storage material is provided. The heat storage material 10 can be used while being housed or placed in a transport container 40.

The transport container 40 includes, for example, a box 41 and a lid 42 which fits an opening 410 of the box, so as to have a thermal insulation property.

A material of the transport container 40 is not limited to any particular one, provided that the material of the transport container 40 has a thermal insulation property. From the viewpoint of employing a lightweight and inexpensive material which can prevent dew condensation, it is suitable to employ a foamed plastic as the material of the transport container 40. From the viewpoint of employing a material which has an excellent thermal insulation property, which maintains a temperature for a long period of time and which can prevent dew condensation, it is suitable to use a vacuum thermal insulation material as the material of the transport container 40. Examples of the foamed plastic include foamed polyurethane, foamed polystyrene, foamed polyethylene, foamed polypropylene, foamed AS resin, and foamed ABS resin. Examples of the vacuum thermal insulation material include vacuum thermal insulation materials whose cores are made of silica powder, glass wool, and glass fiber. The transport container 40 can be constituted by a combination of the foamed plastic and the vacuum thermal insulation material. In such a case, a transport container 40 having a high thermal insulation performance can be produced by, for example, (i) covering, with the vacuum thermal insulation material, an outer surface or an inner surface of each of the box 41 and the lid 42 that are made of foamed plastic, or (ii) embedding the vacuum thermal insulation material in walls constituting each of the box 41 and the lid 42 that are made of foamed plastic.

Figure 4A:
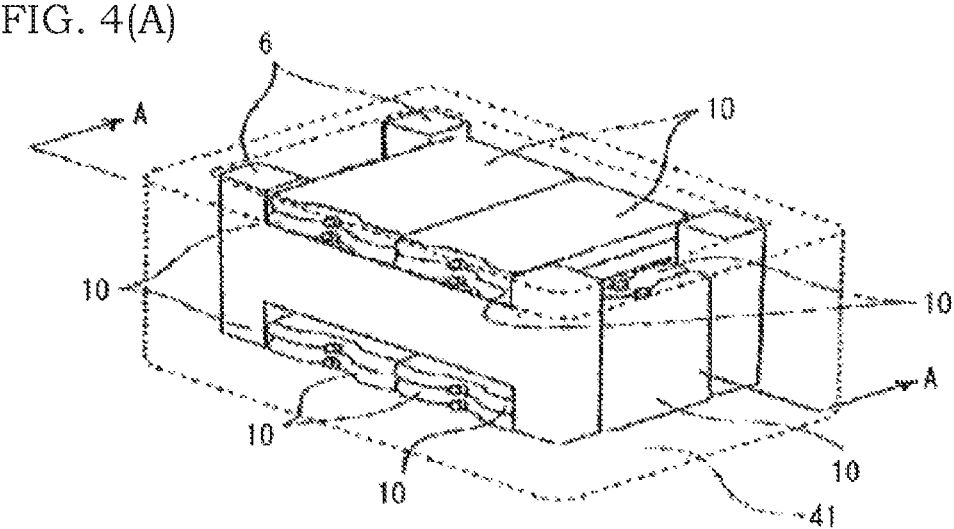
FIG. 4(A) is a perspective view schematically illustrating an inside of the transport container illustrated in FIG. 3.
Figure 4B:
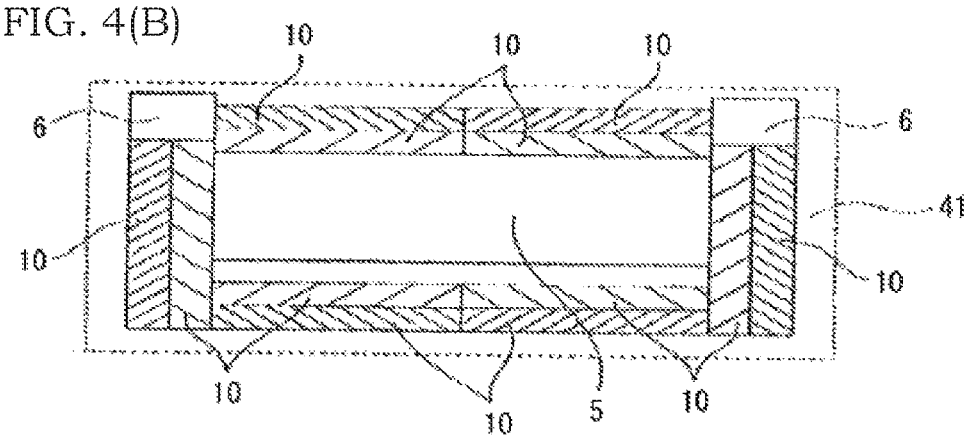
FIG. 4(B) is a cross-sectional view schematically illustrating a plane taken along the line A-A shown in FIG. 4(A).

FIG. 4(A) is a perspective view schematically illustrating an inside of the transport container 1. FIG. 4(B) is a cross-sectional view schematically illustrating a plane taken along the line A-A shown in FIG. 4(A).

As illustrated in FIG. 3(B), (i) the transport container 40 includes the box 41 and the lid 42, and (ii) the transport container 1 in accordance with one or more embodiments of the present invention includes the transport container 40, the heat storage materials 10, and spacers 6. As illustrated in FIGS. 3 and 4, the transport container 1 in accordance with one or more embodiments of the present invention can include the spacers 6 which, when the heat storage materials 10 are housed or placed in the transport container 1, are intended to (1) fill a space between (a) a surface of the lid 42 which covers a space in the box, lateral surfaces 412 of the box, and a bottom surface 411 of the box and (b) the heat storage materials 10 and (2) secure a space 5 for placing a temperature control target article.

A material of the spacers 6 is not limited to any particular one. Examples of the material include polyurethane, polystyrene, polyethylene, polypropylene, AS resin, ABS resin, and a foamed plastic obtained by foaming such a resin.

According to one or more embodiments of the present invention, a pair of spacers 6 is placed in the transport container 40 such that the spacers 6 face each other. In a case where the transport container 1 in accordance with one or more embodiments of the present invention includes the spacers 6, where to place the heat storage materials 10 is fixed. This makes packing easier.

With the transport container in accordance with one or more embodiments of the present invention, it is possible to store or transport an article that requires temperature control, while the article is maintained at a temperature within a range from 0° C. to 10° C. for a long period of time regardless of an ambient temperature. The transport container in accordance with the present embodiment can be suitably used to store or transport various kinds of articles such as pharmaceutical products, medical devices, specimens, organs, chemical substances, food, and the like that require temperature control.

Note that more specifically, the thermal insulation container described above can be configured as disclosed in Japanese Patent Application Publication Tokukai No. 2015-78307, which is incorporated herein by reference.

One or more embodiments of the present invention can be configured as below.

<1> A heat storage material composition in accordance with one or more embodiments of the present invention contains: sodium sulfate 10-hydrate; sodium bromide; and sodium chloride, the heat storage material composition having a melting point and a solidifying point within a range of 0° C. to 10° C.

<2> The heat storage material composition in accordance with one or more embodiments of the present invention is preferably configured such that the sodium bromide and the sodium chloride are contained in a total amount of not less than 0.5 mol and not more than 2.0 mol, relative to 1.0 mol of the sodium sulfate 10-hydrate.

<3> The heat storage material composition in accordance with one or more embodiments of the present invention is preferably configured to further contain potassium chloride.

<4> The heat storage material composition is preferably configured such that the potassium chloride is contained in an amount of less than 0.2 mol, relative to 1.0 mol of the sodium sulfate 10-hydrate.

<5> The heat storage material composition in accordance with one or more embodiments of the present invention is preferably configured such that the following relational expression is satisfied:

$-3.0 \leq T_1 - T_2 \leq 0$, where $T_1$ represents a temperature at which the heat storage material composition starts melting, and $T_2$ represents a temperature at which the heat storage material composition finishes melting.

<6> The heat storage material composition in accordance with one or more embodiments of the present invention is preferably configured such that the following relational expression is satisfied:

$0 \leq T_3 - T_4 \leq 8$, where $T_3$ represents a temperature at which the heat storage material composition starts solidifying, and $T_4$ represents a temperature at which the heat storage material composition finishes solidifying.

<7> The heat storage material composition in accordance with one or more embodiments of the present invention is preferably configured such that an ammonium salt is contained in an amount of not more than 1 wt %.

<8> The heat storage material composition in accordance with one or more embodiments of the present invention is preferably configured to have a latent heat quantity of not less than 150 J/g.

<9> A heat storage material in accordance with one or more embodiments of the present invention contains the heat storage material composition.

<10> A transport container in accordance with one or more embodiments of the present invention includes the heat storage material.

The configurations described in the above items can also be applied in other item(s) as appropriate. The following description will more specifically discuss one or more embodiments of the present invention with reference to Examples. However, one or more embodiments of the present invention are not limited to such Examples.

EXAMPLES

<Preparation of Heat Storage Material Composition>

With respect to 100 parts by weight of sodium sulfate 10-hydrate (manufactured by Wako Pure Chemical Industries, Ltd.), 5 parts by weight of sodium tetraborate 10-hydrate (manufactured by Wako Pure Chemical Industries, Ltd.) as a supercooling inhibitor, 1 part by weight of oleic acid (Nsp manufactured by Hope Chemical Co., LTD.) as a phase separation inhibitor, and 3 parts by weight of carboxy methyl cellulose sodium (CMC2260 manufactured by Daicel FineChem Ltd.) were added. These substances were then mixed while being ground in a mortar.

To a resultant mixture, melting/solidifying point adjusters were added in amounts indicated in Tables 1 to 4. The mixture was then further mixed while being ground in the mortar. A heat storage material composition was thus prepared.

<Measurement of Melting Point and Solidifying Point of Heat Storage Material Composition>

The melting point and the solidifying point of the heat storage material composition were measured by (i) placing a measurement test sample in a thermostatic bath equipped with a temperature control unit and (ii) monitoring a temperature of the measurement test sample with the use of a thermocouple.

Specifically, the heat storage material composition was placed in a test tube, and a thermocouple was inserted into a center part of the heat storage material composition. Subsequently, the test tube was placed in a thermostatic bath, and a temperature inside the thermostatic bath was increased and decreased at a rate of 1° C./min while the temperature of the heat storage material composition was monitored. More specifically, a temperature change cycle in which the temperature inside the thermostatic bath was increased from −50° C. to 50° C. and then decreased from 50° C. to −50° C. was repeated. A graph was made which shows changes in temperature of the heat storage material composition observed during the above temperature changes cycle.

Zones where a temperature change was gradual were found in graph curves associated with the temperature increase. Then, the melting start temperature and the melting finish temperature were obtained from the zones. See FIG. 1 for a general curve of such a graph.

Zones where a temperature change was gradual were found in graph curves associated with the temperature decrease. Then, the solidification start temperature and the solidification finish temperature were obtained from the zones. The graph curves associated with the temperature decrease revealed that the temperature change becomes gradual after the heat storage material composition becomes supercooled. See FIG. 2 for a general curve of such a graph.

The melting point and the solidifying point were evaluated based on the following criteria:

Poor: The melting point or the solidifying point each did not fall within a range of 0° C. to 10° C.

Good: The melting point and the solidifying point each fell within a range of 0° C. to 10° C.

Excellent: (i) The melting point and the solidifying point each fell within a range of 0° C. to 10° C., (ii) regarding respective differences (a) between the melting start temperature and the melting finish temperature and (b) between the solidification start temperature and the solidification finish temperature, the differences were each not more than 3° C. and (iii) the supercooling temperature was not higher than 3° C.

<Measurement of Quantity of Latent Heat of Heat Storage Material Composition>

The temperature of the heat storage material composition was decreased from 50° C. to −25° C. at a rate of 2° C./min, and then increased from −25° C. to 50° C. at the same rate of 2° C./min. In so doing, melting/solidifying behaviors of the heat storage material composition were analyzed with the use of a differential scanning calorimeter (SIT EXSTAR6000 DSC manufactured by Seiko Instruments Inc.).

The quantity of latent heat of the heat storage material composition was calculated based on a melting peak area in a chart obtained in such analysis.

<Measurement of Odor of Heat Storage Material Composition>

An odor of the heat storage material composition was measured with the use of an ammonia gas detector XP-3160 manufactured by New Cosmos Electric Co., Ltd. A detection tube was placed at a position 100 mm apart from the sample in the mortar. Then, gas detection was carried out for 5 minutes. In a case where ammonia gas of not less than 100 ppm was observed, the odor was determined to be "present". In contrast, in a case where a measurement value of ammonia gas was 100 ppm, the odor was determined to be "absent".

<Test Results>

The following tables show test results.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| $Na_2SO_4 \cdot 10H_2O$ | Mol | 1 | 1 | 1 | 1 | 1 | 1 | 1 | 1 | 1 | 1 |
| NaBr | | 0.7 | 0.8 | 0.7 | 0.95 | 0.9 | 0.85 | 0.95 | 0.9 | 0.85 | 0.8 |
| NaCl | | 0.3 | 0.3 | 0.4 | 0.15 | 0.2 | 0.25 | 0.2 | 0.25 | 0.3 | 0.4 |
| Total amount of melting/solidifying point adjuster | | 1 | 1.1 | 1.1 | 1.1 | 1.1 | 1.1 | 1.15 | 1.15 | 1.15 | 1.2 |
| $Na_2SO_4 \cdot 10H_2O$ | Ratio by weight | 78.2 | 76.3 | 77.2 | 75.2 | 75.5 | 75.9 | 74.6 | 75 | 75.4 | 75.3 |
| NaBr | | 17.5 | 19.5 | 17.2 | 22.8 | 21.7 | 20.6 | 22.6 | 21.6 | 20.5 | 19.2 |
| NaCl | | 4.3 | 4.2 | 5.6 | 2.0 | 2.7 | 3.4 | 2.7 | 3.4 | 4.1 | 5.5 |
| Melting process | Start temperature | 6.9 | 7.7 | 7.1 | 7.5 | 7.1 | 7.1 | 7.1 | 7.1 | 7.1 | 7.1 |
| | Finish temperature | 8.1 | 8.9 | 8.3 | 8.1 | 8.2 | 8.2 | 8.4 | 8.4 | 8.4 | 8.7 |
| | Difference | −1.2 | −1.2 | −1.2 | −0.6 | −1.1 | −1.1 | −1.3 | −1.3 | −1.3 | −1.6 |
| Solidifying process | Start temperature | 9.2 | 6.9 | 5.2 | 5.1 | 6.7 | 7.1 | 5.1 | 4.7 | 4.5 | 3.1 |
| | Finish temperature | 1.3 | 2.3 | 2.5 | 1.2 | 1.2 | 1.4 | 1.6 | 1.6 | 1.5 | 2.0 |
| | Difference | 7.9 | 4.6 | 2.7 | 3.9 | 5.5 | 5.7 | 3.5 | 3.1 | 3.0 | 1.1 |
| | Supercooling temperature | 1.6 | 2.5 | 1.3 | 1.4 | 2.3 | 1.9 | 1.6 | 2.0 | 1.8 | 2.4 |
| Quantity of latent heat | J/g | 162 | 159 | 162 | 155 | 154 | 155 | 152 | 154 | 156 | 158 |
| Odor | | Absent | Absent | Absent | Absent | Absent | Absent | Absent | Absent | Absent | Absent |
| Melting point and solidifying point | | Good | Good | Excellent | Good | Good | Good | Good | Good | Excellent | Excellent |

| | | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| $Na_2SO_4 \cdot 10H_2O$ | Mol | 1 | 1 | 1 | 1 | 1 | 1 | 1 | 1 | 1 |
| NaBr | | 0.7 | 0.95 | 0.9 | 0.85 | 1 | 0.8 | 0.6 | 0.8 | 0.7 |
| NaCl | | 0.5 | 0.25 | 0.3 | 0.35 | 0.2 | 0.4 | 0.6 | 0.5 | 0.6 |
| Total amount of melting/solidifying point adjuster | | 1.2 | 1.2 | 1.2 | 1.2 | 1.2 | 1.2 | 1.2 | 1.3 | 1.3 |
| $Na_2SO_4 \cdot 10H_2O$ | Ratio by weight | 76.1 | 74.1 | 74.5 | 74.9 | 73.8 | 75.3 | 76.9 | 74.3 | 75.1 |
| NaBr | | 17.0 | 22.5 | 21.4 | 20.3 | 23.6 | 19.2 | 14.7 | 19 | 16.8 |
| NaCl | | 6.9 | 3.4 | 4.1 | 4.8 | 2.7 | 5.5 | 8.4 | 6.7 | 8.2 |
| Melting process | Start temperature | 7.1 | 7.1 | 7.1 | 7.1 | 6.1 | 7.1 | 7.4 | 6.9 | 6.9 |
| | Finish temperature | 8.7 | 8.2 | 8.2 | 8.2 | 7.6 | 8.6 | 9.9 | 9.3 | 9.3 |
| | Difference | −1.6 | −1.1 | −1.1 | −1.1 | −1.5 | −1.5 | −2.5 | −2.4 | −2.4 |
| Solidifying process | Start temperature | 3.3 | 3.4 | 2.7 | 3.4 | 3.0 | 3.5 | 3.2 | 2.0 | 2.1 |
| | Finish temperature | 2.2 | 2.0 | 1.6 | 2.0 | 1.8 | 2.0 | 2.1 | 1.5 | 1.6 |
| | Difference | 1.1 | 1.4 | 1.1 | 1.4 | 1.2 | 1.5 | 1.1 | 0.5 | 0.5 |
| | Supercooling temperature | 2.6 | 1.8 | 1.3 | 1.8 | 2.5 | 2.4 | 2.7 | 3.9 | 3.9 |
| Quantity of latent heat | J/g | 160 | 153 | 154 | 155 | 156 | 160 | 165 | 160 | 162 |
| Odor | | Absent | Absent | Absent | Absent | Absent | Absent | Absent | Absent | Absent |
| Melting point and solidifying point | | Excellent | Excellent | Excellent | Excellent | Excellent | Excellent | Excellent | Good | Good |

"Ex." stands for "Example".

(Table 1)

Table 1 shows test results of Examples 1 to 19. Heat storage material compositions prepared in respective Examples 1 to 19 each contained sodium bromide and sodium chloride as melting/solidifying point adjusters.

In Examples 1 to 19, evaluation results were "Excellent" in all of "Quantity of latent heat", "Odor", and "Melting point and solidifying point".

TABLE 2

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| $Na_2SO_4 \cdot 10H_2O$ | wt % | 76 | 70 | 72.3 | 72.3 | 70 | 80 |
| $NH_4Cl$ | wt % | 5 | 12 | 5 | 10 | 16 | 12 |
| $NH_4Br$ | wt % | 10 |  | 10 | 6 | 2 |  |
| NaCl | wt % | 5 |  | 5 | 4 | 5 | 4 |
| $Na_2SO_4$ | wt % |  |  |  | 7.7 | 7.7 | 7 |
| NaBr | wt % |  | 11 |  |  |  |  |
| $(NH_4)_2SO_4$ | wt % | 4 | 7 |  |  |  | 4 |
| Melting process | Start temperature | 5.5 | 5.6 | 5.4 | 6.7 | 9.9 | 9.8 |
|  | Finish temperature | 9.9 | 9.6 | 10.4 | 11.5 | 12.5 | 12.8 |
|  | Difference | −4.4 | −4.0 | −5.0 | −4.8 | −2.6 | −3.0 |
| Solidifying process | Start temperature | 3.8 | 2.2 | 5.7 | 2.4 | 6.8 | 8.2 |
|  | Finish temperature | −2.6 | −2.6 | −2.6 | −2.7 | 4.4 | 3.3 |
|  | Difference | 6.4 | 4.8 | 8.3 | 5.1 | 2.4 | 4.9 |
|  | Supercooling temperature | 2.7 | 1.7 | 6 | 1.9 | 4.8 | 6.2 |
| Quantity of latent heat | J/g | 96 | 87 | 147 | 109 | 111 | 123 |
| Odor |  | Present | Present | Present | Present | Present | Present |
| Melting point and solidifying point |  | Poor | Poor | Poor | Poor | Poor | Poor |

"Com. Ex." stands for "Comparative Example".

(Table 2)

Table 2 shows test results of Comparative Examples 1 to 6. Tests in Comparative Examples 1 to 6 were concerning Patent Literature 2 which is a conventional art document. Heat storage material compositions that were prepared in respective Comparative Examples 1 to 6 each contained an ammonium salt as a melting/solidifying point adjuster.

In Comparative Examples 1 to 6, evaluation results were "Poor" in all of "Quantity of latent heat", "Odor", and "Melting point and solidifying point".

Note that further studies were made in regard to a relation between the amount of the ammonium salt contained and the odor. As a result, the studies revealed that the amount of the ammonium salt contained was not more than 1 wt % of the heat storage material composition at a limit of the odor detection.

(Table 3)

Table 3 shows test results of Comparative Examples 7 to 16. In Comparative Examples 7 to 16, sodium bromide, sodium chloride, potassium chloride, or potassium bromide was used alone as a melting/solidifying point adjuster or sodium bromide and potassium chloride were used in combination as melting/solidifying point adjusters.

In Comparative Example 7 to 16, evaluation results were "Poor" in "Melting point and Solidifying point".

TABLE 3

|  |  | Com. Ex. 7 | Com. Ex. 8 | Com. Ex. 9 | Com. Ex. 10 | Com. Ex. 11 | Com. Ex. 12 | Com. Ex. 13 | Com. Ex. 14 | Com. Ex. 15 | Com. Ex. 16 |
|---|---|---|---|---|---|---|---|---|---|---|---|
| $Na_2SO_4 \cdot 10H_2O$ | Mol | 1 | 1 | 1 | 1 | 1 | 1 | 1 | 1 | 1 | 1 |
| NaBr |  | 1.2 | 1 |  |  |  |  |  | 0.9 | 0.8 | 0.7 |
| NaCl |  |  |  | 1.2 |  |  |  |  |  |  |  |
| KCl |  |  |  |  | 1.2 | 1 |  |  | 0.3 | 0.4 | 0.5 |
| KBr |  |  |  |  |  |  | 1.2 | 1 |  |  |  |
| Total amount of melting/solidifying point adjuster |  | 1.2 | 1 | 1.2 | 1.2 | 1 | 1.2 | 1 | 1.2 | 1.2 | 1.2 |
| $Na_2SO_4 \cdot 10H_2O$ | Ratio by weight | 72.4 | 75.8 | 82.1 | 78.3 | 81.3 | 67.0 | 73.0 | 73.7 | 74.2 | 74.7 |
| NaBr |  | 27.6 | 24.2 |  |  |  |  |  | 21.2 | 19.1 | 16.6 |
| NaCl |  |  |  | 17.9 |  |  |  |  |  |  |  |
| KCl |  |  |  |  | 21.7 | 18.7 |  |  | 5.1 | 6.8 | 8.7 |
| KBr |  |  |  |  |  |  | 33.0 | 27.0 |  |  |  |
| Melting process | Start temperature | 7.4 | 6.9 | 20.0 | 8.1 | 9.3 | 8.6 | 10.4 | 5.8 | 5.6 | 5.6 |
|  | Finish temperature | 8.4 | 7.6 | 21.5 | 9.8 | 10.2 | 11.2 | 11.1 | 7.9 | 8.1 | 8.1 |
|  | Difference | −1.0 | −0.7 | −1.5 | −1.7 | −0.9 | −2.6 | −0.7 | −2.1 | −2.5 | −2.5 |
| Solidifying process | Start temperature | 3.0 | 9.0 | 13.6 | 11.0 | 9.3 | 1.7 | 11.0 | 5.1 | 3.6 | 3.6 |
|  | Finish temperature | −0.5 | −0.1 | 8.7 | −5.5 | −3.2 | −4.4 | −3.2 | −2.3 | −3.4 | −3.4 |
|  | Difference | 3.5 | 9.1 | 4.9 | 15.5 | 12.2 | 6.1 | 14.2 | 7.4 | 7.0 | 7.0 |
|  | Supercooling temperature | 1.6 | 1.5 | 2.5 | 2.5 | 0.4 | 1.3 | 2.4 | 2.4 | 1.6 | 1.6 |
| Quantity of latent heat | J/g | 145 | 152 | 158 | 137 | 142 | 119 | 125 | 130 | 128 | 118 |
| Odor |  | Absent | Absent | Absent | Absent | Absent | Absent | Absent | Absent | Absent | Absent |
| Melting point and solidifying point |  | Poor | Poor | Poor | Poor | Poor | Poor | Poor | Poor | Poor | Poor |

"Com. Ex." stands for "Comparative Example".

TABLE 4

|  |  | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|
| $Na_2SO_4 \cdot 10H_2O$ | Mol | 1 | 1 | 1 | 1 | 1 | 1 | 1 | 1 | 1 |
| NaBr |  | 0.6 | 0.6 | 0.6 | 0.6 | 0.6 | 0.6 | 0.7 | 0.7 | 0.7 |
| NaCl |  | 0.43 | 0.45 | 0.47 | 0.5 | 0.53 | 0.55 | 0.4 | 0.5 | 0.6 |
| KCl |  | 0.17 | 0.15 | 0.13 | 0.1 | 0.07 | 0.05 | 0.1 | 0.1 | 0.1 |
| Total amount of NaBr and NaCl |  | 1.03 | 1.05 | 1.07 | 1.1 | 1.13 | 1.15 | 1.1 | 1.2 | 1.3 |
| Total amount of melting/solidifying |  | 1.2 | 1.2 | 1.2 | 1.2 | 1.2 | 1.2 | 1.2 | 1.3 | 1.4 |
| $Na_2SO_4 \cdot 10H_2O$ | Ratio by weight | 75.4 | 76.5 | 76.5 | 76.6 | 76.7 | 76.7 | 75.8 | 74.8 | 73.8 |
| NaBr |  | 14.6 | 14.6 | 14.7 | 14.7 | 14.7 | 14.7 | 16.9 | 16.7 | 16.5 |
| NaCl |  | 6.0 | 6.2 | 6.5 | 6.9 | 7.4 | 7.7 | 5.5 | 6.8 | 8.0 |
| KCl |  | 3.0 | 2.7 | 2.3 | 1.8 | 1.2 | 0.9 | 1.8 | 1.7 | 1.7 |
| Melting process | Start temperature | 5.3 | 5.3 | 5.3 | 5.5 | 5.3 | 5.1 | 5.6 | 4.8 | 5.0 |
|  | Finish temperature | 7.9 | 7.9 | 7.9 | 9.3 | 9.6 | 9.7 | 8.7 | 9.1 | 8.9 |
|  | Difference | −2.6 | −2.6 | −2.6 | −3.8 | −4.3 | −4.6 | −3.1 | −4.3 | −3.9 |
| Solidifying process | Start temperature | 3.5 | 3.7 | 3.9 | 4.5 | 4.4 | 3.8 | 4.5 | 1.3 | 1.1 |
|  | Finish temperature | 0.8 | 1.0 | 1.3 | 1.9 | 1.6 | 1.9 | 2.0 | 0.7 | 0.5 |
|  | Difference | 2.7 | 2.7 | 2.1 | 2.6 | 2.8 | 1.9 | 2.5 | 0.6 | 0.6 |
|  | Supercooling temperature | 2.1 | 2.3 | 2.8 | 1.8 | 2.2 | 2.6 | 2.1 | 3.2 | 3.0 |
| Quantity of latent heat | J/g | 160 | 161 | 161 | 161 | 161 | 161 | 159 | 157 | 155 |
| Odor |  | Absent | Absent | Absent | Absent | Absent | Absent | Absent | Absent | Absent |
| Melting point and solidifying point |  | Excellent | Excellent | Excellent | Good | Good | Good | Good | Good | Good |

"Ex." stands for "Example".

(Table 4)

Table 2 shows test results of Examples 20 to 28. Heat storage material composition prepared in respective Examples 20 to 28 each contained, as melting/solidifying point adjusters, potassium chloride in addition to sodium bromide and sodium chloride.

In Examples 20 to 28, evaluation results were "Excellent" in all of "Quantity of latent heat", "Odor", and "Melting point and solidifying point".

<Performance Test of Transport Container>

Transport containers were produced with the use of heat storage materials each filled with a heat storage material composition. The following description will discuss, with reference to FIGS. 3 and 4, how the transport containers were produced. A box used for a transport container 40 was a foamed polystyrene thermal insulation container (AC-525, manufactured by Tamai Kasei Corporation, External dimensions: Width 620 mm×Depth 420 mm×Height 470 mm, Internal dimensions: Width 500 mm×Depth 300 mm×Height 350 mm, Thermal insulation thickness: 60 mm, and Internal volume: approx. 52.5 L). Heat storage material compositions 20 used to fill the heat storage materials 10 were the heat storage material composition prepared in Example 3 (shown in Table 1) and the heat storage material composition prepared in Example 22 (shown in Table 4).

First, 14 heat storage materials 10 were left to stand still in a thermostatic bath at a temperature of −2° C. for 24 hours so that the heat storage materials 10 were in the solidified state. Then, the 14 heat storage materials 10 were placed (in other words, packed) in the box 41 of the transport container 40 with the use of the spacers 6, so as to surround the space 5 in which a temperature control target article would be placed. Specifically, there were placed the 14 heat storage materials 10 in total including 4 heat storage materials 10 along the bottom surface 411 of the box, 2 heat storage materials 10 along each surface of a pair of opposite surfaces of the lateral surfaces 412 of the box, and 6 heat storage materials 10 above the opening 410 (see FIG. 4(A) and FIG. 4(B)). FIGS. 3 and 4 each show an example of the transport container 1, which includes 12 heat storage materials. In this Example, transport containers 1 each including 14 heat storage materials were produced. Note that the number of heat storage materials included in the transport container 1 is not limited, and can be any arbitrary number.

Figure 5:
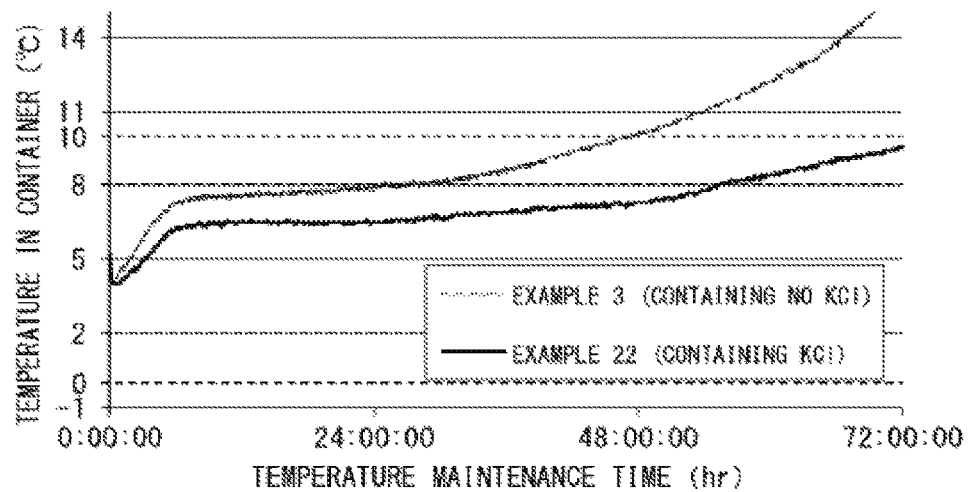
FIG. 5 is a graph schematically illustrating how the temperature in the transport container 1 illustrated in FIG. 3 in accordance with one or more embodiments of the present invention changed over time in a case where the transport container 1 was left in an environment at a temperature of 35° C. Such a change in temperature over time of the transport container 1 is a change during a process in which the heat storage material composition was melting from the solid state into the liquid state in a case where heat storage materials 10 filled with the heat storage material composition were placed in the transport container 1.

A temperature data logger (Product name: RTR-51, manufactured by T&D Corporation) was attached to a center part of the box 41 of the transport container 40 produced as described above. Then, the lid 42 was closed, so that a transport container 1 was completed. The transport container 1 thus obtained was placed in a thermostatic bath set at a temperature of 35° C. Subsequently, a shift in temperature at the center part of the container was measured with the use of the temperature data logger at intervals of 5 minutes. FIG. 5 shows results of the measurement.

Figure 6:
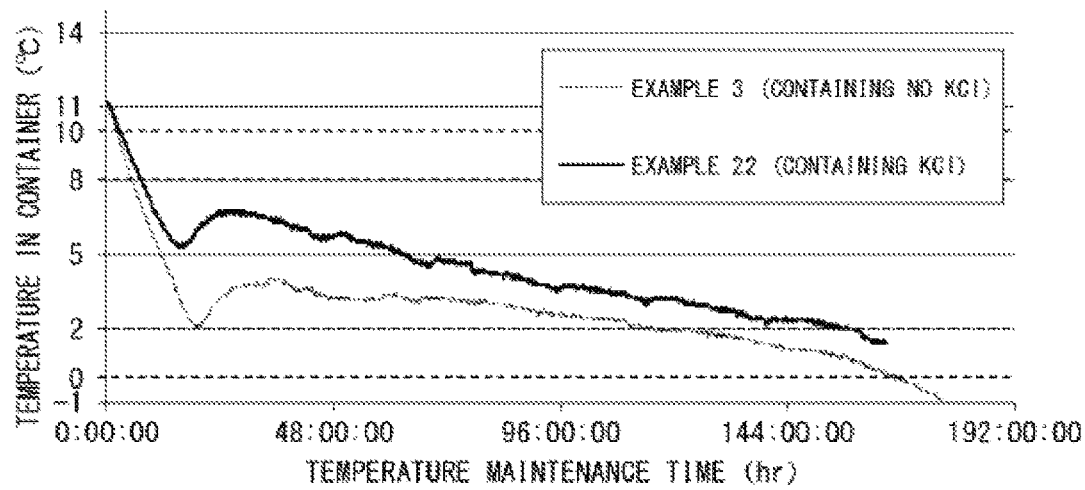
FIG. 6 is a graph schematically illustrating how the temperature in the transport container 1 illustrated in FIG. 3 in accordance with one or more embodiments of the present invention changed over time in a case where the transport container 1 was left in an environment at a temperature of −10° C. Such a change in temperature over time of the transport container 1 is a change during a process in which the heat storage material composition was solidifying from the liquid state into the solid state in a case where heat storage materials 10 filled with the heat storage material composition were placed in the transport container 1.

Another transport container 1 was produced as with the above-described transport container 1 except that, before packing, the heat storage materials 10 were left to stand still in a thermostatic bath at a temperature of 12° C. for 24 hours so that the heat storage materials 10 were in the molten state. The transport container was then placed in a built-in chamber set at a temperature of −10° C. Subsequently, a shift in temperature at a center part of the container was measured with the use of the temperature data logger at intervals of 5 minutes. FIG. 6 shows results of the measurement.

FIG. 5 illustrates how the temperature in the transport container changed over time in a case where the above-described transport container 1 was left in an environment at a temperature of 35° C. Such a change in temperature over time of the transport container 1 is a change during a process in which the heat storage material composition 20 (the heat storage material composition in accordance with Example 3 or 22) was melting from the solid state into the liquid state in a case where the heat storage materials 10 filled with the heat storage material composition 20 were placed in the transport container 1. According to FIG. 5, the temperature in the transport container was maintained within a range of 2° C. to 8° C. for 32 hours in the case of the transport container including the heat storage materials filled with the heat storage material composition prepared in Example 3, and for 55 hours in the case of the transport container including the heat storage materials filled with the heat storage material composition prepared in Example 22. On the other hand, FIG. 6 illustrates how the temperature in the transport container 1 changed over time in a case where the above-described transport container 1 was left in an environment at a temperature of −10° C. Such a change in temperature over time of the transport container 1 is a change during a process in which the heat storage material composition 20 (the heat storage material composition in accordance with Example 3 or 22) was melting from the liquid state into the liquid state in a case where the heat storage materials 10 filled with the heat storage material composition 20 were placed in the transport container 1. According to FIG. 6, the temperature in the transport container was maintained within a range of 2° C. to 8° C. for 111 hours in the case of the transport container including the heat storage materials filled with the heat storage material composition prepared in Example 3, and for 151 hours in the case of the transport container including the heat storage materials filled with the heat storage material composition prepared in Example 22. As shown in FIGS. 5 and 6, the temperature in the transport container was maintained within a temperature range of 2° C. to 8° C. for a longer period of time during both of melting and solidification in the case of the transport container including the heat storage materials filled with the heat storage material composition that was prepared in Example 22 and that contained potassium chloride, as compared with the case of the transport container including the heat storage materials filled with the heat storage material composition which was produced in Example 3 and which contained no potassium chloride.

A heat storage material composition in accordance with one or more embodiments of the present invention, a heat storage material containing the heat storage material composition, and a transport container including the heat storage material each allow a temperature control target article (e.g., pharmaceutical products, specimens, and food) whose control temperature is above 0° C. to be stored or transported such that the temperature control target article is kept at its control temperature under a specific environment.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A heat storage material composition, comprising:
    sodium sulfate 10-hydrate;
    sodium bromide; and
    sodium chloride,
    wherein the sodium bromide and the sodium chloride are contained in a total amount of 0.5 mol to 2.0 mol, relative to 1.0 mol of the sodium sulfate 10-hydrate, and
    wherein the heat storage material composition has a melting point and a solidifying point within a range of 0° C. to 10° C.

2. The heat storage material composition of claim 1, further comprising:
    potassium chloride.

3. The heat storage material composition of claim 2, wherein the potassium chloride is contained in an amount of less than 0.2 mol, relative to 1.0 mol of the sodium sulfate 10-hydrate.

4. The heat storage material composition of claim 1, wherein the following relational expression is satisfied:

$-3.0 \leq T_1 - T_2 \leq 0$, wherein $T_1$ represents a temperature at which the heat storage material composition starts melting, and $T_2$ represents a temperature at which the heat storage material composition finishes melting.

5. The heat storage material composition of claim 1, wherein the following relational expression is satisfied:

$0 \leq T_3 - T_4 \leq 8$, wherein $T_3$ represents a temperature at which the heat storage material composition starts solidifying, and $T_4$ represents a temperature at which the heat storage material composition finishes solidifying.

6. The heat storage material composition of claim 1, wherein an ammonium salt is contained in an amount of not more than 1 wt %.

7. The heat storage material composition of claim 1, having a latent heat quantity of not less than 150 J/g.

8. A heat storage material, comprising:
    the heat storage material composition of claim 1.

9. A transport container, comprising:
    the heat storage material of claim 8.

* * * * *